United States Patent
Pritchard, Jr. et al.

(10) Patent No.: US 11,555,413 B2
(45) Date of Patent: Jan. 17, 2023

(54) SYSTEM AND METHOD FOR TREATING AN INSTALLED AND ASSEMBLED GAS TURBINE ENGINE

(71) Applicants: General Electric Company, Schenectady, NY (US); Oliver Crispin Robotics Limited, Altrincham (GB)

(72) Inventors: Byron Andrew Pritchard, Jr., Loveland, OH (US); Keith Anthony Lauria, Wells, NY (US); Erica Elizabeth Sampson, Scotia, NY (US); Bernard Patrick Bewlay, Niskayuna, NY (US); Ambarish Jayant Kulkarni, Glenville, NY (US); Michael Robert Millhaem, Cincinnati, OH (US); William Francis Navojosky, Ballston Spa, NY (US); Nicole Jessica Tibbetts, Delanson, NY (US); Gongguan Wang, Shanghai (CN); Andrew Crispin Graham, Badminton (GB)

(73) Assignees: General Electric Company, Schenectady, NY (US); Oliver Crispin Robotics Limited, Altrincham (GB)

(*) Notice: Subject to any disclaimer, the term of this patent is extended or adjusted under 35 U.S.C. 154(b) by 42 days.

(21) Appl. No.: 17/220,112

(22) Filed: Apr. 1, 2021

(65) Prior Publication Data
US 2022/0090516 A1 Mar. 24, 2022

Related U.S. Application Data

(63) Continuation-in-part of application No. 17/027,754, filed on Sep. 22, 2020, now Pat. No. 11,371,425.

(51) Int. Cl.
*F01D 25/00* (2006.01)
*B08B 3/02* (2006.01)

(52) U.S. Cl.
CPC .............. *F01D 25/002* (2013.01); *B08B 3/02* (2013.01); *F05D 2220/323* (2013.01); *F05D 2230/72* (2013.01); *F05D 2230/90* (2013.01)

(58) Field of Classification Search
None
See application file for complete search history.

(56) References Cited

U.S. PATENT DOCUMENTS

| 3,751,297 A | 8/1973 | Minbiole |
|---|---|---|
| 4,671,230 A | 6/1987 | Turnipseed |

(Continued)

FOREIGN PATENT DOCUMENTS

| CN | 1460037 A | 12/2003 |
|---|---|---|
| CN | 103506341 A | 1/2014 |

(Continued)

OTHER PUBLICATIONS

USPTO; U.S. Appl. No. 17/027,754; Notice of Allowance and Fees Due (PTOL-85) dated May 16, 2022; (pp. 1-2).

*Primary Examiner* — Eric W Golightly
(74) *Attorney, Agent, or Firm* — Fitch, Even, Tabin & Flannery LLP

(57) ABSTRACT

Systems and methods for treating a component of an installed and assembled gas turbine engine are provided. Accordingly, the method includes operably coupling a delivery assembly to an annular inlet of a core gas turbine engine. A portion of treating fluid is atomized with the delivery assembly to develop a treating mist having a plurality of atomized droplets. The atomized droplets are suspended within any path of the core gas turbine engine from the annular inlet to an axial position downstream of a compressor of the core gas turbine engine. A portion of the treating mist is impacted or precipitated onto the component so as to (Continued)

Figure 1:
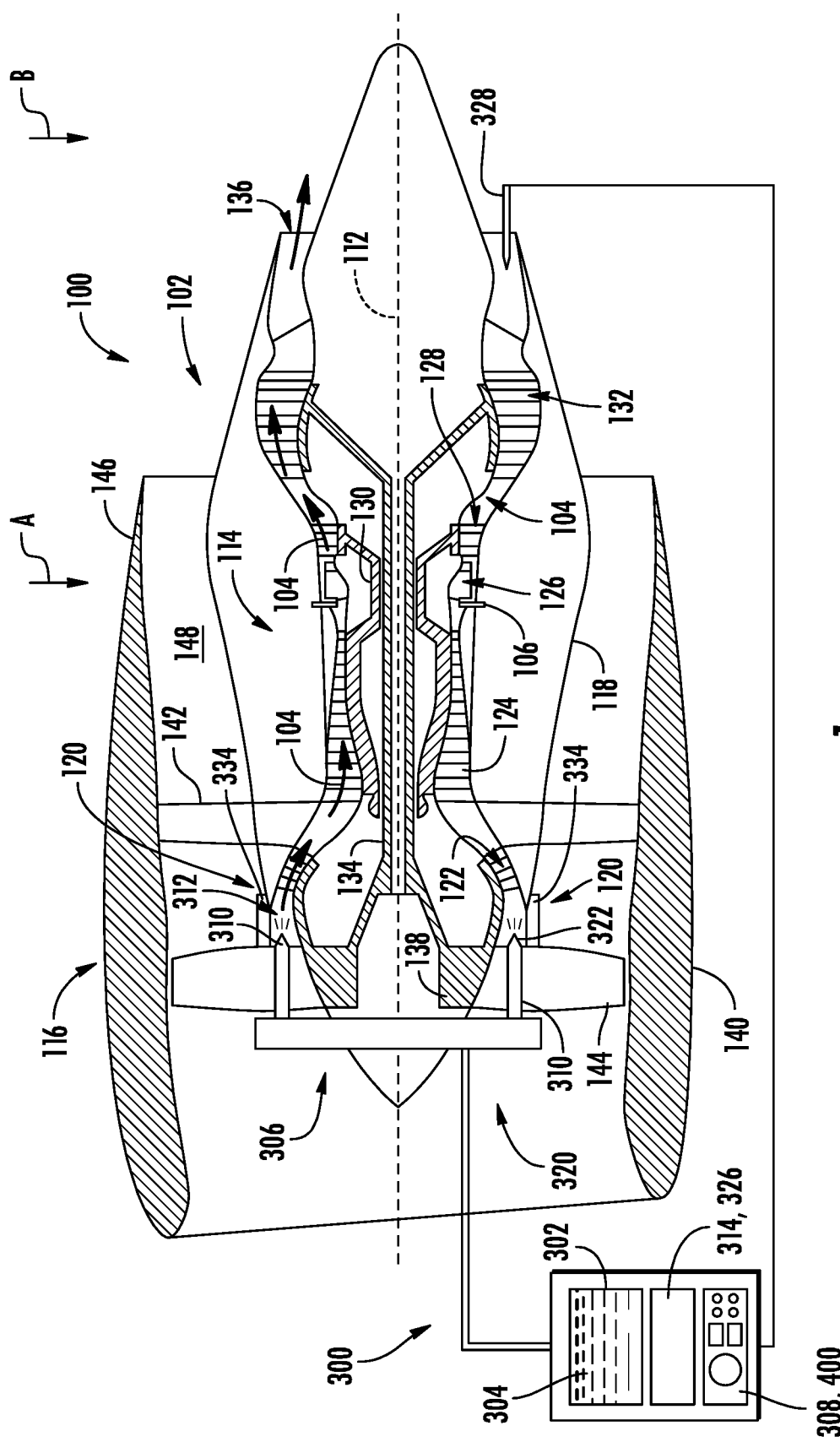

wet the component, and a portion of the deposits on the component is dissolved by the treating mist.

21 Claims, 6 Drawing Sheets

(56) References Cited

U.S. PATENT DOCUMENTS

| | | | |
|---|---|---|---|
| 4,834,912 | A | 5/1989 | Hodgens, II |
| 4,995,915 | A | 2/1991 | Sewell |
| 5,809,771 | A | 9/1998 | Wernberg |
| 5,938,855 | A | 8/1999 | Bowden, Jr. |
| 6,553,768 | B1 | 4/2003 | Trewin et al. |
| 6,663,718 | B1 | 12/2003 | Mush |
| 6,977,015 | B2 | 12/2005 | Hardwicke et al. |
| 7,033,979 | B2 | 4/2006 | Herwig |
| 7,445,677 | B1 | 11/2008 | Asplund |
| 7,523,603 | B2 | 4/2009 | Hagen |
| 7,674,341 | B2 | 3/2010 | Stansilaw |
| 7,815,743 | B2 | 10/2010 | Asplund et al. |
| 7,964,027 | B2 | 6/2011 | Hauzer |
| 8,028,936 | B2 | 10/2011 | McDermott |
| 8,192,688 | B2 | 6/2012 | Hagen |
| 8,277,647 | B2 | 10/2012 | Rice |
| 8,632,638 | B2 | 1/2014 | Simpson-Green |
| 8,741,381 | B2 | 6/2014 | Zhang |
| 9,138,782 | B2 | 9/2015 | Dorshimer |
| 9,175,606 | B2 | 11/2015 | Bassmann |
| 9,239,013 | B2 | 1/2016 | Zhang |
| 9,657,589 | B2 | 5/2017 | Hjerpe |
| 9,739,168 | B2 | 8/2017 | Ekanayake |
| 10,634,004 | B2 | 4/2020 | Giljohann |
| 10,669,885 | B2 | 6/2020 | Pecchiol |
| 10,731,508 | B2 | 8/2020 | Tibbetts |
| 10,920,181 | B2 | 2/2021 | Martin |
| 11,261,797 | B2 | 3/2022 | Xie |
| 11,371,425 | B2 | 6/2022 | Pritchard, Jr. |
| 2009/0180939 | A1 | 7/2009 | Hagen |
| 2009/0211601 | A1 | 8/2009 | Hauzer |
| 2011/0289927 | A1 | 12/2011 | Wagner |
| 2012/0167547 | A1 | 7/2012 | Zhang |
| 2013/0330172 | A1 | 12/2013 | Scipio |
| 2015/0354403 | A1 | 12/2015 | Ekanayake |
| 2017/0165721 | A1 | 6/2017 | Tibbetts et al. |
| 2017/0167920 | A1 | 6/2017 | Lee |
| 2017/0191376 | A1 | 7/2017 | Eriksen |
| 2017/0254218 | A1 | 9/2017 | Bewlay |
| 2017/0329307 | A1 | 11/2017 | Castillo-Effen |
| 2018/0245477 | A1 | 8/2018 | Kulkarni |
| 2021/0108537 | A1 | 4/2021 | Rigg |
| 2021/0317752 | A1 | 10/2021 | Deja |
| 2022/0090537 | A1 | 3/2022 | Pritchard, Jr. |

FOREIGN PATENT DOCUMENTS

| | | |
|---|---|---|
| CN | 106988800 A | 7/2017 |
| CN | 108698090 A | 10/2018 |
| DE | 102013202616 B4 | 10/2015 |
| DE | 102014206084 | 10/2015 |
| DE | 102015006330 B4 | 8/2019 |
| JP | 2007152231 A | 6/2007 |
| JP | 2014069100 A | 4/2014 |
| WO | 2020022474 A1 | 1/2020 |
| WO | 2020030516 A1 | 2/2020 |

SYSTEM AND METHOD FOR TREATING AN INSTALLED AND ASSEMBLED GAS TURBINE ENGINE

RELATED APPLICATIONS

The present invention is a continuation-in-part of U.S. application Ser. No. 17/027,754 filed on Sep. 22, 2020, and issued as U.S. Pat. No. 11,371,425 on Jun. 28, 2022, and claims priority thereto. Accordingly, U.S. application Ser. No. 17/027,754 is incorporated herein by reference in its entirety for all purposes.

FIELD

The present subject matter relates generally to gas turbine engines, and more particularly, to systems and methods for treating components of assembled gas turbine engines on-wing.

BACKGROUND

A typical aircraft-mounted gas turbine engine includes gas turbine engine components having very fine cooling passages that allow for higher gas temperatures in the combustor and/or the high-pressure or low-pressure turbines. During operation, particularly in environments that contain fine-scale dust, environmental particulate accumulates on engine components and within the cooling passages of the engine. For example, dust (reacted or non-reacted), sand, or similar, can build up on the flow path components and on the component, internal, impingement cooled surfaces during turbine engine operation. In addition, particulate matter entrained in the air that enters the turbine engine and the cooling passages can contain sulfur-containing species that can corrode the components. Such deposits can lead to reduced cooling effectiveness of the components and/or corrosive reaction with the metals and/or coatings of the engine components. Thus, deposits can lead to premature distress, reduced engine life, and/or increased repair/maintenance costs (e.g cost to restore components during an engine overhaul. Additionally, accumulations of environmental contaminants (e.g. dust-reacted and unreacted, sand, etc.) can degrade aerodynamic performance of the high-pressure components and lower fuel efficiency of the engine through changes in airfoil morphology and/or affect coatings applied to the engine components. As such, it may be desirable from time to time to treat the components of the assembled gas turbine engine on-wing. For example, treating the blades and vanes of the compressor may improve the efficiency of compression and result in a lower fuel consumption and/or lower exit temperature for the compressor. These, in turn, may result in a lower operating temperature of the hot section of the engine, which may increase the operating life of the various components.

Accordingly, an improved method to treat gas turbine engine components would be useful.

BRIEF DESCRIPTION

Aspects and advantages of the invention will be set forth in part in the following description, or may be obvious from the description, or may be learned through practice of the invention.

In one aspect, the present disclosure is directed to a method for treating at least one component of an installed and assembled gas turbine engine. The gas turbine engine may include a core gas turbine engine. The core gas turbine engine may have an absence of powered rotation during the treating. The method may include operably coupling a delivery assembly to an annular inlet of the core gas turbine engine. The delivery assembly may be coupled to a control unit and a storage vessel containing a treating fluid. The method may also include atomizing a portion of the treating fluid with the delivery assembly to develop a treating mist. The treating mist may include a plurality of atomized droplets. The method may include suspending the atomized droplets of the treating mist within an airflow within at least one flow path of the core gas turbine engine. The treating mist may occupy a cross-sectional area of the at least one flow path to establish a simultaneous cross-sectional contact therein. At least a portion of the atomized droplets may remain suspended within the flow path(s) from the annular inlet to an axial position downstream of a high-pressure compressor of the gas turbine engine. Additionally, the method may include impacting or precipitating a portion of the treating mist onto the component(s) so as to wet at least 80% of an exposed, inlet-facing surface of the component(s).

In an embodiment, the atomized droplets may have a median diameter of less than or equal to 5 microns and the treating mist has a fluid-to-air mass ratio of at least 0.025 and less than or equal to 5.0 kilograms of treating fluid to kilograms of air.

In an additional embodiment, a thermal state of the core gas turbine engine may be less than or equal to 135% of an ambient air absolute temperature and the axial position downstream of the high-pressure compressor may be an axial position downstream of the installed and assembled gas turbine engine.

In a further embodiment, the method may include establishing an elevated delivery temperature of the treating mist which increases the vapor content of the treating mist within the flow path(s).

In an embodiment, the method may include supplying a surge portion of the treating mist to the core gas turbine engine. The method may also include operably decoupling the delivery assembly from the annular inlet. Further, the method may include establishing a soak period during which the treating fluid affects at least one of the component(s) and a deposit thereon.

In an additional embodiment, the delivery assembly may include an array of nozzles. Each nozzle of the array of nozzles may be configured to develop atomized droplets having a median diameter of less than or equal to 5 microns. The method may also include actuating at least one nozzle of the array of nozzles to establish a treating mist volume. The treating mist volume may include a concentration of atomized droplets within a specified portion of the flow path(s). The treating mist volume may be characterized by a fluid-to-air mass ratio of at least 0.025 and less than or equal to 5.0 kilograms of treating fluid to kilograms of air.

In a further embodiment, the method may include obtaining environmental data. The environmental data may include an ambient temperature, an ambient pressure, and an ambient humidity affecting the installed and assembled gas turbine engine. The method may also include obtaining data indicative of a thermal state of the core gas turbine engine. Based on the environmental data and the data indicative of the thermal state of the core gas turbine engine, the method may include establishing the treating mist volume delivered to the annular inlet. Establishing the treating mist volume may also include establishing a treating mist flow rate within the flow path(s).

In an embodiment, the method may include monitoring an absolute humidity level at a point-of-departure from the installed and assembled gas turbine engine. The method may also include utilizing the monitored humidity level to determine a percentage of the delivered treating mist remaining suspended at the point-of-departure from the installed and assembled gas turbine engine. Additionally, the method may include adjusting the treating mist volume delivered to the annular inlet based on the determined percentage so as to achieve a desired level of wetting of the component(s).

In an additional embodiment, the method may include determining a first volume of treating fluid atomized and delivered as the treating mist to the annular inlet. The method may also include determining a second volume of treating fluid suspended at the point-of-departure from the installed and assembled gas turbine engine based on the monitored humidity level. Additionally, the method may include computing the portion of the first volume of treating fluid precipitated onto the component(s) based on a difference between the first and second volumes. Further, the method may include adjusting the treating mist volume delivered to the annular inlet so that the second volume is less than or equal to 35% of the first volume.

In a further embodiment, the delivery assembly may include an array of nozzles. Additionally, operably coupling the delivery assembly to the annular inlet may also include positioning the array of nozzles within a fan section of the gas turbine engine so that an outlet of each nozzle of the array of nozzles is arranged at an axial location between the fan section and the annular inlet of the core gas turbine engine. Additionally, the method may include circumscribing the array of nozzles with at least one blocking element. The blocking element(s) may at least partially occlude an alternative flow path.

In an embodiment, wherein treating the component(s) of the installed and assembled gas turbine engine is repeated at least once every 30 days.

In an additional embodiment, the method may include establishing a treating cycle. The treating cycle may have a duration of 30 minutes or less. The method may also include operably decoupling the delivery assembly from the annular inlet by a conclusion of the treating cycle.

In a further embodiment, atomizing a portion of the treating fluid may include atomizing less than 120 liters of treating fluid.

In yet a further embodiment, the treating fluid may be a cleaning fluid, and the treating mist may be a cleaning mist. The method may also include dissolving at least a portion of a deposit on the component(s) so as to remove the deposit.

In an embodiment, the treating fluid may be a corrosion inhibitor. The corrosion inhibitor may be a catalyst configured to react with at least one identified contaminant so as to inhibit corrosion of the component(s).

In an additional embodiment, the treating fluid may be a sealant configured to preclude a contact between a contaminant and the component(s).

In a further embodiment, atomizing the portion of the treating fluid may include atomizing the portion of the treating fluid via a vibrating mesh nebulizer so as to develop the plurality of atomized droplets having a median diameter of at least 2 microns and less than or equal to 5 microns.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 shows a schematic cross-sectional view of one embodiment of a gas turbine engine and a system for treating a component of the gas turbine engine according to the present disclosure;

FIG. 2 shows a schematic view of a portion of the gas turbine engine of FIG. 1 and an embodiment of the system for treating the component according to the present disclosure.

FIG. 3 shows a schematic view of a portion of the gas turbine engine of FIG. 1 and an embodiment of the system for treating the component according to the present disclosure.

FIG. 4 shows a schematic view of an embodiment of a system for treating the component according to the present disclosure; and FIG. 5 depicts an exemplary controller such as for use in the exemplary systems of FIGS. 1-4; and FIG. 6 illustrates a flow diagram of one embodiment of a method for treating a component of the gas turbine engine of FIG. 1 according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “first” and “second” may be used interchangeably to distinguish one component(s) from another and are not intended to signify location or importance of the individual component(s)s.

As used herein, the term “vapor” refers to a substance in the gaseous state, as distinguished from the liquid or solid state.

The terms “upstream” and “downstream” refer to the relative direction with respect to fluid flow in a fluid pathway. For example, “upstream” refers to the direction from which the fluid flows, and “downstream” refers to the direction to which the fluid flows. As used herein, the fluid flow is in the direction encountered by the gas turbine engine in flight operations.

As used herein, the phrases “constructed of CMCs” and “comprised of CMCs” shall mean component(s)s substantially constructed of ceramic matrix composites (CMCs). More specifically, the CMC component(s)s shall include more CMC material than just a layer or coating of CMC materials. For example, the component(s)s constructed of CMCs may be comprised or constructed substantially or entirely of CMC materials, including greater than about 50, 60, 70, 80, 90, or 100 percent CMC material.

Certain approaches for treating (e.g. cleaning, sealing, etc.) assembled engines may rely on foam or liquids. However, the physical characteristics of the treating medium may impose limits on the engine surfaces which may be affected. Additionally, certain approaches to treating engines on-wing may require the aircraft to be positioned in a maintenance area of an airfield and taken out of service for an undesirable length of time. For example, certain approaches may require that the aircraft be taken out of service for 4-9 hours and may require the disassembly of a portion of the engine, the presence of a crew in a cockpit, and/or an external power source to rotate the engine. As a result of these drawbacks, it may not be practical for these treating approaches to be practiced more than 2-4 times per year. The extended intervals between treatments, such as cleanings, may result in the engine being operated in a fouled condition for a greater percentage of the time and/or suffering damage due to corrosion.

One or more of the above-identified issues may be addressed by the presently disclosed methods and systems. In particular, methods and systems are generally provided for treating (e.g. sealing and/or removing deposits from) components of an installed and assembled gas turbine engine. The methods of the present disclosure generally provide for introducing a treating mist into the annular inlet of the engine. The treating mist may include atomized particles of a treating fluid which are sized to permit at least a portion of the treating mist to remain suspended in a flow path of the core engine at least to a location downstream of a high-pressure compressor. As the treating mist flows along the flow path, the atomized particles may encounter various components of the engine. When encountering the various components, the atomized particles may impact the component and/or precipitate onto the component thereby wetting the component with the treating fluid. By utilizing the treating mist, the methods described herein may be accomplished in 30 minutes or less without requiring the disassembly or rotation of the engine. Additionally, the utilization of the treating mist to wet the components facilitates an efficient treating cycle utilizing less than 120 liters treating fluid.

Referring now to the drawings, FIG. 1 illustrates a cross-sectional view of one embodiment of an installed and assembled gas turbine engine 100 configured as an installed and assembled gas turbine engine. The engine 100 may be utilized with an aircraft in accordance with aspects of the present subject matter. However, the engine 100 may also suitable for employment in electrical power generating applications, ship propulsion applications, and/or ground vehicle propulsion applications.

The engine 100 is illustrated in FIG. 1 as having a longitudinal or axial centerline axis 112 extending therethrough for reference purposes. In an embodiment, the engine 100 may include at least one component 102 configured to affect a portion of ambient air entering the engine 100. The component(s) 102 may include any of the elements of the engine 100 discussed herein. In an embodiment, the component(s) 102 may, for example, be formed from CMC, titanium, steel, aluminum, nickel, chromium and/or combinations thereof. Additionally, it should be appreciated that while the engine 100 is depicted in FIG. 1 as a turbofan jet engine, the systems and methods described herein may be employed on any turbomachine including, but not limited to, high-bypass turbofan engines, low-bypass turbofan engines, turbojet engines, turboprop engines, turboshaft engines, propfan engines, and so forth.

In general, the engine 100 may include a core gas turbine engine (indicated generally by reference character 114) and a fan section 116 positioned upstream thereof. The core engine 114 may generally include a substantially tubular outer casing 118 that defines an annular inlet 120. The annular inlet 120 may define an entrance to at least one flow path 104 of the core engine 114

In an embodiment, the outer casing 118 may enclose and support a booster compressor 122 for increasing the pressure of the air that enters the core engine 114 to a first pressure level. A high-pressure (HP), multi-stage, axial-flow compressor 124 may be serially arranged at an axial position downstream of the booster compressor 122. In operation, the HP compressor 124 may receive the pressurized air from the booster compressor 122 and further increase the pressure of such air.

In an embodiment, a combustor 126 may be serially arranged at an axial position downstream of the HP compressor 124. In operation, pressurized air exiting the HP compressor 124 may flow to the combustor 126 within which fuel may be injected by a fuel system 106 into the flow of pressurized air, with the resulting mixture being combusted within the combustor 126.

Referring still to FIG. 1, in an embodiment, an HP turbine 128 may be serially arranged at an axial position downstream of the combustor 126 so that high energy combustion products may be directed from the combustor 126 along the flow path(s) 104 of the engine 100 to the HP turbine 128 for driving the HP compressor 124 via an HP driveshaft 130.

In an embodiment, a low-pressure (LP) turbine 132 may be serially arranged at an axial position downstream of the HP turbine 128. The LP turbine 132 may be configured for driving the booster compressor 122 and the fan section 116 via an LP driveshaft 134. In an embodiment, the LP driveshaft 134 may be generally coaxial with HP driveshaft 130.

As depicted in FIG. 1, the flow path(s) 104 may communicatively couple the annular inlet 120 with a point-of-departure 136 from the engine 100. For example, in operation, after driving the HP turbine 128 and the LP turbine 132, the combustion products in the flow path(s) 104 may be expelled from the core engine 114 via the point-of-departure 136 configured as an exhaust nozzle to provide propulsive jet thrust.

It should be appreciated that each turbine may generally include one or more turbine stages, with each stage including a turbine nozzle and a downstream turbine rotor. As will be described below, the turbine nozzle may include a plurality of vanes disposed in an annular array about the centerline axis 112 of the engine 100 for turning or otherwise directing the flow of combustion products through the turbine stage towards a corresponding annular array of rotor blades forming part of the turbine rotor. As is generally understood, the rotor blades may be coupled to a rotor disk of the turbine rotor, which is, in turn, rotationally coupled to the turbine's driveshafts 130, 134.

Additionally, as shown in FIG. 1, the fan section 116 of the engine 100 may generally include a rotatable, axial-flow fan rotor 138 surrounded by an annular fan casing 140. In an embodiment, the LP driveshaft 134 may be operably coupled to the fan rotor 138. It should be appreciated that the fan casing 140 may be supported relative to the core engine 114 by a plurality of substantially radially-extending, circumferentially-spaced outlet guide vanes 142. As such, the fan casing 140 may enclose the fan rotor 138 and its corresponding fan rotor blades 144. Moreover, a downstream section 146 of the fan casing 140 may extend over an outer portion of the core engine 114 to define at least one alternative flow path 148 between the fan casing 140 and the outer casing 118 of the core engine 114. In an embodiment, the alternative flow path(s) 148 may provide additional propulsive jet thrust.

As shown in FIGS. 1-4, in an embodiment, a system 300 may be utilized to treat the component(s) 102 of the installed and assembled gas turbine engine 100 (e.g., an assembled, on-wing gas turbine engine). The system 300 may be employed when the core engine 114 is essentially stationary and not being rotated via the application of a power source. The system 300 may include a storage vessel 302 containing a treating fluid 304. The system 300 may also include a delivery assembly 306 operably coupled to the storage vessel 302 and a control unit 308. The delivery assembly 306 may include at least one nozzle 310 configured to atomize a portion of the treating fluid 304 in order to develop a treating mist 312. The treating mist 312 may include a plurality of atomized droplets. The atomized droplets may have a median diameter, and thus mass, which facilitates suspension of the atomized droplets within the flow path(s) 104 of the core engine 114. In an embodiment, a portion of the atomized droplets of the treating mist 312 may be suspended within an airflow 318 within the flow path(s) 104 from the annular inlet 120 to an axial position (A) downstream of the HP compressor 124. The treating mist 312 may occupy a cross-sectional area of the flow path(s) 104 to establish a simultaneous cross-sectional contact therein. In other words, in an embodiment, the treating mist 312 may essentially fill the flow path(s) 104 at a given axial location without requiring that the engine 100 be rotated. The system 300 may also include a flow generation assembly 314 which may be oriented to facilitate a passage of the treating mist 312 along the flow path(s) 104 of the core engine 114. It should be appreciated that, in an embodiment, the engine 100 may be permitted to rotate at a rate not exceeding 5 rotations per minute (RPM) so as to facilitate specific treatment approaches (e.g, an extended cleaning and/or a treatment specifically directed to internal circuits of the cooling system). For example, in an embodiment, the engine 100 may be rotated at a rate of at least 0.05 RPM but less than or equal to 1.0 RPM.

In an embodiment, the treating fluid 304 may include any suitable composition now known or later developed in the art. For example, in an embodiment, the treating fluid 304 may be configured as a cleaning fluid and may include a biodegradable citric and/or glycolic-acid composition including both ionic and non-ionic surfactants. Additionally, the treating fluid 304 may be compatible with all coatings and components 102 internal and external to the engine 100 and suitable for on-wing application. The treating fluid 304 may be utilized without requiring a rinse step prior to firing the engine 100 following the treating/cleaning. As a cleaning fluid, treating fluid 304 may demonstrate no pitting corrosion or intergranular attack to engine parent metals or coating systems. Accordingly, the treating fluid 304 may be a water-based cleaning fluid. For example, in an embodiment, the treating fluid 304 may be a water-detergent combination. In a further embodiment, the treating fluid 304 may be water without a detergent. Additionally, the water may be treated to remove potential contaminants, such as by distillation and/or deionization. It should be appreciated that when configured as a cleaning fluid, the treating fluid 304 may also include corrosion inhibition properties.

In an additional embodiment, the treating fluid 304 may be configured as a corrosion inhibitor. In such an embodiment, the corrosion inhibitor may be a catalyst configured to react with at least one identified contaminant so as to inhibit corrosion of the component (s) 102. For example, the treating fluid 304 may, in an embodiment, be a catalyst which reacts with sulfur. By reacting with sulfur, the treating fluid 304 may preclude an additional chemical reaction with the sulfur (or a compound thereof) which may corrode the component (s) 102. Similarly, in an embodiment, the treating fluid 304 may be a catalyst which reacts with carbon so as to preclude corrosion of the component (s) 102.

In an embodiment, the treating fluid 304 may be configured as a sealant. Accordingly, the treating fluid 304 may preclude contact between a contaminant and component (s) 102. For example, in an embodiment, corrosion of hot sections of the engine 100, such as the HP turbine 128, may stem from sulphates which are stable at relatively high temperatures. In such an embodiment, the sealant may be a high-temp sealant, such as an aluminum oxide-based coating or a phosphate-based coating. By way of further example, in an embodiment, corrosion of cold sections of the engine 100, such as the fan section 116 and/or the booster compressor 122, may stem from salts. In such an embodiment, a low-temp sealant, such as a wax or other similar coating may be employed. Additionally, the sealant may be a hydrophobic coating which at least partially repels contaminants, resist corrosion, and/or reduces an aeronautical drag. The hydrophobic coating may, for example, be a Teflon fluoropolymer coating, a ceramic-based coating (e.g., a silica-based liquid polymer), an aqueous polymer, and/or an aqueous polyurethane.

In an embodiment, the treating fluid 304 may be configured as an inspection aide. As such, the treating flow 304 may, in an embodiment be a dye. In such an embodiment, the treating fluid 304 may be employed to wet the component(s) 102 and then may be rinsed and allowed to dry. Following the drying, the dye may remain within cracks oxidation sites, fretting sites, and/or other defects thereby facilitating the detection of areas of the component(s) 102 requiring maintenance and/or repair.

It should be appreciated that, in an embodiment, the treating fluid 304 may include compositions configured to affect the component (s) 102 in more than one manner. For example, the treating fluid 304 may include a first composition configured to dissolve a deposit on the component (s) 102 and a second composition configured to seal the component (s) 102.

In an embodiment, the treating fluid 304 may be configured to affect the component(s) 102 by wetting the component(s) 102. The wetting of the component(s) 102 may, in an embodiment, include the formation of a liquid film that substantially covers an exposed surface of the component(s) 102. For example, the system 300 may be configured to form a liquid film over greater than 75% (e.g., at least 80%) of the exposed, inlet-facing surface of the component(s) 102 (e.g., blades and vanes of the HP compressor 124).

It should be appreciated that the wetting of the component(s) 102 may permit the treating fluid 304, such as a cleaning fluid, to dissolve/de-bond a portion of the deposit on the component(s) 102. The dissolution of a portion of the deposit may weaken a bond between the deposited contamination and the surface of the component(s) 102. In such an embodiment, the weakened bond may permit an additional portion of the deposited contamination to be removed by thermodynamic and/or mechanical forces during a startup of the engine 100. For example, in an embodiment, a portion of the treating fluid 304 (in atomized droplet form) may penetrate an internal passage of the component(s) 102 to remove a portion of a deposit therein.

In an embodiment, the treating fluid 304 may be configured to be delivered to the engine 100 at a constant rate. In an additional embodiment, the treating fluid 304 may be delivered to the engine 100 at a variable rate. For example, in an embodiment, a first portion of the treating fluid 304 may be delivered at the initiation of the treating cycle so as to rapidly wet the component(s) 102. The amount of treating fluid 304 delivered to the engine may then be reduced and the wetted component(s) 102 may be permitted to soak. During the soak, a desired level of wetness may be maintained via a second portion of the treating fluid 304, which may be less than the first portion of the treating fluid 304. Following at least one soak. A third portion of the treating fluid 304 may be introduced so as to increase the wetness of the component(s) 102. As is more fully described below, the third portion of the treating fluid 304 may be considered a surge portion.

It should be appreciated that, in an embodiment, the treating fluid 304 may be delivered a single portion without necessitating the introduction of any additional portions of the treating fluid 304. For example, in an embodiment wherein the treating fluid comprises a sealant, a corrosion treatment, and/or a carbon treatment, a single portion of the treating fluid 304 may be employed to wet the component(s) 102 and achieve the desired treatment thereof. It should further be appreciated that the system 300 may be employed to implement more than one sequential treatment operation. In such an embodiment the treating fluid 304 may be selected to correspond to the desired sequential treatment operation. For example, in an embodiment, the treating fluid 304 may, in a first treatment operation be configured as a cleaning fluid. Following the cleaning of the engine 100, the treating fluid 304 may be configured for a second treatment operation as a corrosion inhibitor and the engine 100 may be treated in accordance with the systems and methods disclosed herein.

In an embodiment, atomizing a portion of the treating fluid 304 with the delivery assembly 306 may develop the treating mist 312. The treating mist 312 may include a plurality of atomized droplets of the treating fluid 304 suspended in a volume of gas, such as a volume of atmospheric air. For example, in an embodiment wherein the treating fluid 304 is a water-based treating fluid, the development of the treating mist 312 may result in a supersaturated vapor component of the treating mist 312 having a water content in excess of that naturally occurring under prevailing ambient conditions. In other words, the atomization of the water of the treating fluid 304 may result in a portion of the atomized droplets evaporating in the air to which the atomized droplets of the treating fluid 304 are introduced, thereby raising the fluid content of the resultant vapor component of the treating mist 312. The remaining portion of the atomized treating fluid 304 comprising the treating mist 312 may remain as water and/or water-detergent droplets which are entrained in a flow of the vapor component. In an embodiment, the treating mist 312 may have a fluid-to-air mass ratio of at least 0.025 and less than or equal to 5.0 kilograms of treating fluid to kilograms of air. For example, in an embodiment, the fluid-to-air mass ratio may be at least 0.4 and less than 1.0.

It should be appreciated that the effectiveness of the treating mist 312 may be increased by heating the treating fluid 304, heating the portion of air into which the atomized droplets of the treating fluid 304 are introduced, and/or increasing the delivery pressure of the treating fluid 304 prior to delivery of the treating mist 312 to the annular inlet 120. Such techniques may increase the fluid content of the treating mist 312 thereby facilitating the wetting of the component(s) 102. For example, for a water-based treating fluid 304, the treating fluid 304 may be expelled by the nozzle 310 at a temperature from 95° C. to 260° C. and/or a pressure from 10 kPa to 3,500 kPa. In such an embodiment, the engine 100 to be cleaned may be at a standard atmosphere of 15° C. at 101.325 kPa. Upon delivery to the annular inlet, the treating fluid 304 may encounter lower pressure and temperature conditions than the delivery pressure and temperature, such that the treatment compound vaporizes (if not already a vapor). Because the water-based treatment compound has a delivery pressure (partial pressure) from 103 kPa to 3,447 kPa, and the saturation pressure of a water-based compound at 15° C. is about 1.705 kPa, the resultant vapor may be supersaturated. It should be appreciated that the term "supersaturated," as used herein, refers to a vapor of a compound that has a higher partial pressure than the vapor pressure of the compound.

In order to increase the temperature of the treating fluid 304 and/or the portion of air into which it is introduced, the system 300 may include at least one heating element 316. The heating element(s) 316 may be positioned in thermal contact with the treating mist 312 so as to establish an elevated delivery temperature of the treating mist 312 relative to the ambient temperature which increases the vapor content of the treating mist 312. For example, in an embodiment, the heating element(s) 316 may be positioned in thermal contact with the treating fluid 304 contained within the storage vessel 302. In an additional embodiment, the heating element(s) 316 may be positioned in thermal contact with an airflow 318 generated by the flow generation assembly 314. Positioning the heating element(s) 316 in thermal contact with the airflow 318 may increase the temperature of the portion of air into which the atomized droplets of the treating fluid 304 are introduced.

Referring still to FIGS. 1-4, in an embodiment, the atomized droplets of the treating mist 312 may have a median diameter, and therefore mass, which facilitates the atomized droplets remaining suspended in a portion of air within the flow path(s) 104. At least a portion of the atomized droplets may be entrained in the airflow 318 through the flow path(s) 104 from the annular inlet 120 to the axial position (A) downstream of the HP compressor 124. It should be appreciated that at various points along the flow path(s) 104, the airflow 318 may experience a deceleration, such as due to a directional change of the airflow 318 or an effect of drag on a boundary layer of the airflow 318. As a result of the deceleration, the airflow 318 (or a portion thereof, such as a boundary layer) may lack the necessary energy to retain atomized droplets above a specified mass, as defined by the median diameter. When the energy level of the airflow 318 drops below a given threshold for atomized particles of a given size, the atomized particles may depart the airflow 318 and impact/precipitate within the core engine 114. Further, for atomized droplets of a given size, the inertial energy of the droplets may result in the atomized droplets departing the airflow 318.

While the atomized droplets of the treating mist 312 may have a median diameter that facilitates remaining suspended in the portion of air within the flow path(s) 104, the atomized droplets must also have sufficient mass to violate a flow field of the airflow 318 adjacent to the component(s) 102 and precipitate onto the component(s) 102. In other words, atomized particles lacking sufficient mass for a given flow may lack sufficient energy to violate a flow field of the airflow 318 (e.g., have a Stokes number of less than 1), may remain entrained in the airflow 318, and may pass through the gas turbine engine 100 without wetting the component(s) 102. Therefore, in an embodiment, the atomized particles may have a Stokes number which is greater than 1 (to facilitate the wetting of the booster compressor 122), while remaining sufficiently low to facilitate wetting the downstream components (e.g., the LP turbine 132) of the engine 100.

Contrary to expectations, atomized droplets having a median diameter greater than 10 microns, a low average velocity, but a relatively high local booster inlet velocity may not be suitable for wetting the component(s) 102 at an axial position downstream of the booster compressor 122. This may be attributed to the atomized droplets having too great of a mass and/or the velocity of the airflow 318 (average and/or local velocity) being too great. For example, approximately 90% or greater of atomized droplets having a median diameter greater than 10 microns for an airflow 318 velocity of at least 0.2 feet per second (fps) and less than or equal to 10 fps may impact a component of the gas turbine engine 100 prior to passing the booster compressor 122, while the remaining approximately 10% may pass through the gas turbine engine 100 without wetting the component(s) 102 downstream of the booster compressor 122. Accordingly, in order for at least a portion of the atomized droplets to remain suspended within the flow path(s) 104 from the annular inlet 120 to the axial position (A) while still wetting components 102 adjacent to the annular inlet 120, the atomized droplets may, in an embodiment, have a median diameter of less than or equal to 10 microns and the airflow 318 may have a velocity at the annular inlet 120 of at least 0.2 fps and less than or equal to 10 fps (e.g., a range of at least 0.2 fps to less than or equal to 2.0 fps). For example, in an embodiment, the airflow 318 may have an average velocity of 1.0 fps.

In an additional embodiment, the atomized droplets may have a median diameter which is at least 2 microns and less than or equal to 5 microns. Unexpectedly, the development of atomized droplets within the range of 2-5 microns inclusive entrained in an airflow having an average inlet annulus velocity of at least 0.2 fps and less than or equal to 2.0 fps, may facilitate both the atomized droplets remaining entrained within the flow path(s) 104 and the wetting of the component(s) 102 downstream of the booster compressor 122. It may be expected that atomized droplets within this range may be overly controlled by the airflow 318 and therefore pass through the gas turbine engine 100 without wetting the component(s) 102. However, atomized droplets within the range of 2-5 microns inclusive may, in fact, be impacted by the slowing of the airflow 318 within a boundary layer adjacent to the component(s) 102. Accordingly, because the airflow within the boundary layer may have a reduced velocity relative to flow fields at a distance from the surface, the atomized droplets adjacent the surface may have sufficient mass to violate the boundary layer flow As a result, the atomized droplets within the boundary layer may precipitate and wet the surface, while atomized droplets in more distant flow fields remain entrained within the airflow 318.

In an embodiment, the supportability of the treating mist 312 within the flow path(s) 104 may be enhanced by the formation of a treating mist 312 having atomized droplets with a median diameter greater than or equal to 2 microns and less than or equal to 10 microns (e.g., 2-5 microns). In other words, in an embodiment wherein the water and/or water-detergent droplets have a median diameter in a range between 2 and 10 microns inclusive (particularly between 2 and 5 microns inclusive), the droplets may be entrained in the flow of the vapor component which through the core engine 114. For example, in an embodiment, a thermal state of the core engine 114 may be less than or equal to 135% of an ambient air absolute temperature in degrees Celsius. In such an embodiment, the median diameter of the atomized droplets may facilitate a portion of the treating mist 312 remaining suspended within the airflow 318 to an axial position downstream (B) of the installed and assembled gas turbine engine 100.

In order to develop droplets having the required median diameter, the delivery assembly 306 may atomize a portion of the treating fluid 304. For example, the delivery assembly 306 may utilize the nozzle 310 to develop the treating mist 312 having atomized droplets of the desired median diameter. The nozzle 310 may utilize at least one orifice and/or the application of ultrasonic energy via an ultrasonic nozzle to atomize the treating fluid 304. For example, the treating fluid 304 may be drawn through the orifice(s) via a pressure differential across the orifice(s). Alternatively, the treating fluid 304 may be driven through the orifice(s) by the development of a higher pressure within the storage vessel 302 than at the orifice(s). The higher pressure may be developed via a pump, a compressed air source 326, and/or heating. In at least one embodiment, the compressed air source 326 may also be configured as the flow generation assembly 314 to facilitate the passage of the treating mist 312 along the flow path(s) 104.

In an additional embodiment, the nozzle 310 may be configured as an ultrasonic transducer. In such an embodiment, the nozzle 310 may interact with a portion of the treating fluid 304 so as to atomize a portion of the treating fluid 304. The resultant atomized portion may be drawn from the treating fluid 304 by the flow generation assembly 314 for delivery to the annular inlet 120.

In an embodiment, the nozzle 310 may be configured as a vibrating mesh nebulizer. The vibrating mesh nebulizer may be configured to develop droplets having a median diameter of less than or equal to 10 microns. For example, in an embodiment, the vibrating mesh nebulizer may be employed to develop the treating mist 312 with atomized droplets having a median diameter of at least 2 microns and less than or equal to 5 microns so as to facilitate both the suspension of a portion of the atomized droplets within the flow path(s) 104 to at least the axial position downstream (B) and the wetting of at least 80% of the exposed, inlet-facing surface of the component(s) 102.

In an embodiment, the nozzle 310 may utilize surface acoustic wave nebulization to develop droplets having a median diameter of less than or equal to 10 microns. For example, in an embodiment, the vibrating mesh nebulizer may be employed to develop the treating mist 312 with atomized droplets having a median diameter of at least 2 microns and less than or equal to 5 microns so as to facilitate both the suspension of a portion of the atomized droplets within the flow path(s) 104 to at least the axial position downstream (B) and the wetting of at least 80% of the exposed, inlet-facing surface of the component(s) 102.

Figure 2:
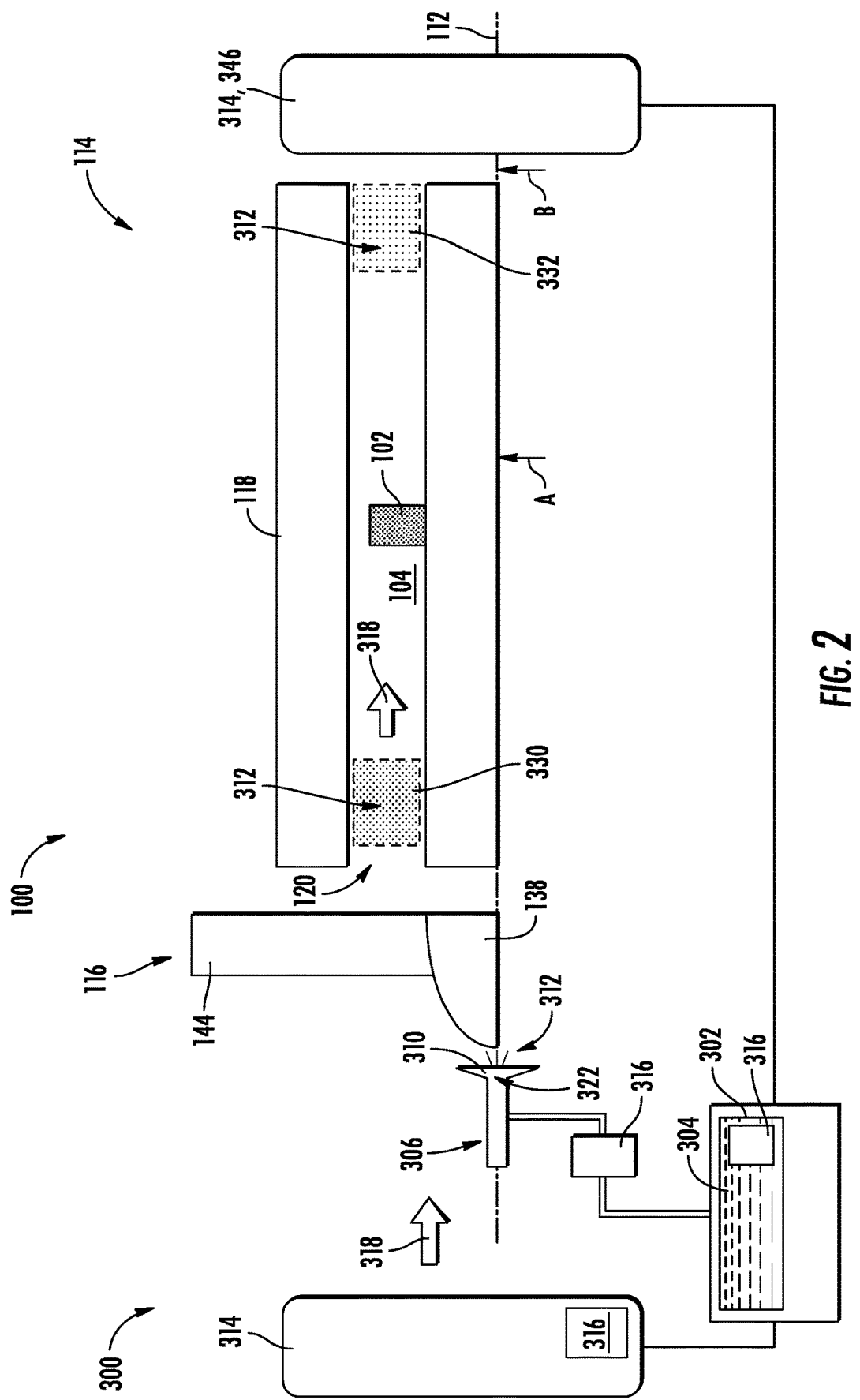

As depicted in FIG. 2, the nozzle 310 may be positioned upstream of the fan section 116 and operably coupled to the annular inlet 120 of the core engine 114. In an additional embodiment, the nozzle 310 may be one of an array of nozzles 320. For example, the array of nozzles 320 may include four or more nozzles 310. As depicted in FIG. 1, the array of nozzles 320 may be arranged to interface with the fan section 116 so as to position an outlet 322 of each nozzle 310 at an axial location between the fan section 116 and the annular inlet 120. In such an embodiment, the number of nozzles 310 of the array of nozzles 320 may correspond to the number of spaces between the fan blades 144 such that at least one nozzle 310 is inserted between each pair of fan blades 144. In an embodiment, the nozzles 310 may be operably coupled to the annular inlet 120 without necessitating contact with the engine 100.

It should be appreciated that, in an embodiment, the nozzle 310 may be positioned at the axial position downstream (B) of the installed and assembled gas turbine engine 100. In such an embodiment, the airflow 318 may be configured to progress from the point-of-departure 136 toward annular inlet 120 (e.g., the airflow 318 may be reversed relative to the nominal passage of air through the gas turbine engine 100 during operation). In such an embodiment, a portion of the treating mist 312 with atomized droplets having a median diameter of at least 2 microns and less than or equal to 5 microns may be suspended within the flow path(s) 104 to at least an axial position axially upstream of the HP compressor 124. It should be appreciated that the introduction of the treating mist 312 at the point-of-departure 136 may facilitate the treatment of targeted components of the gas turbine engine 100.

In an embodiment wherein the delivery assembly 306 includes the array of nozzles 320, modifying the number of nozzles 310 employed to atomize the portion of the treating fluid 304 may affect the concentration of atomized droplets within a specified portion 330 of the flow path(s) 104. As such, modifying the number of nozzles 310 may establish a treating mist volume. For example, in an embodiment wherein the entire array of nozzles 320 is activated, the concentration of atomized droplets may be greater than in an embodiment wherein the majority of the array of nozzles 320 are idle.

Figure 3:
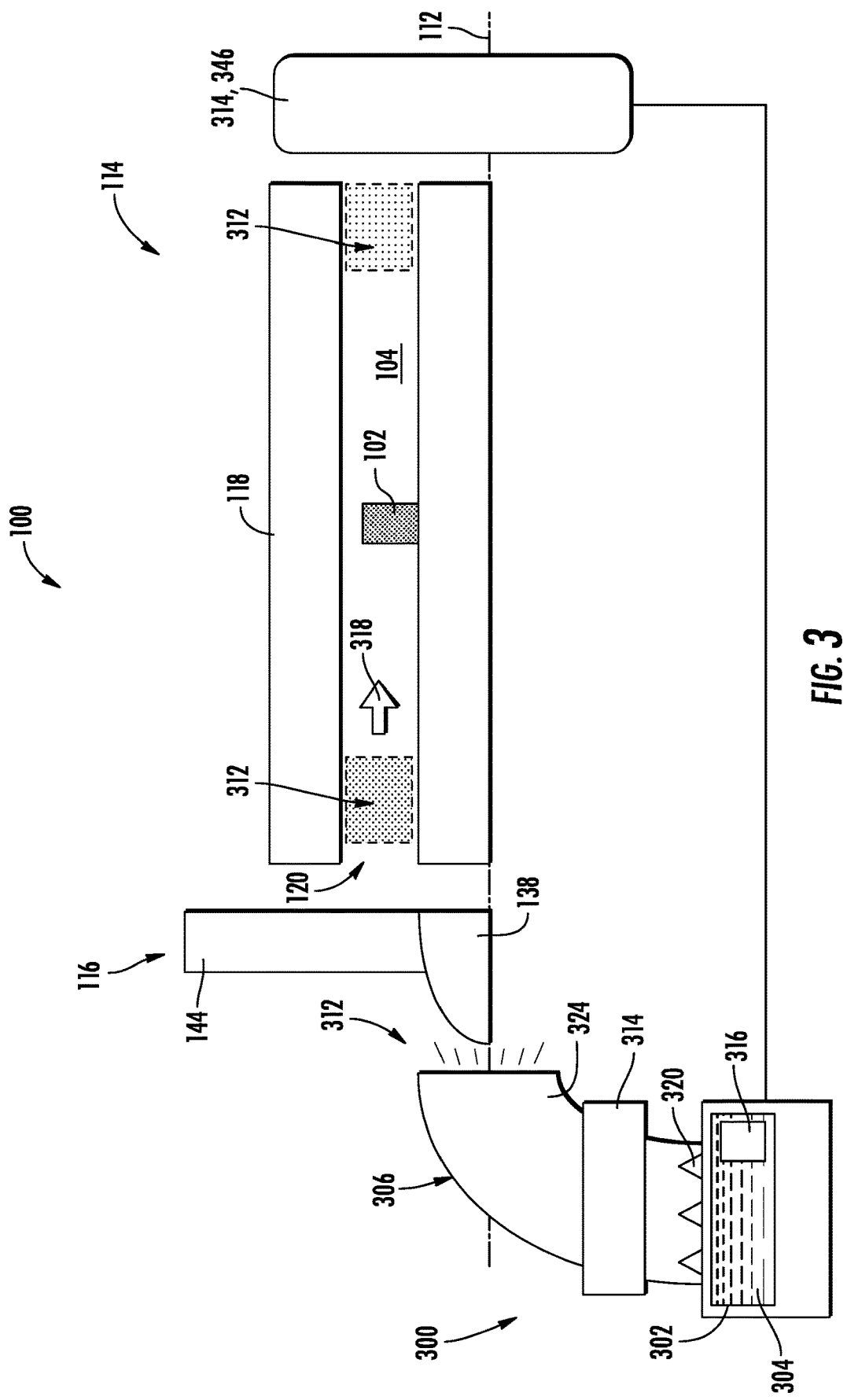

Referring now particularly to FIG. 3, in an embodiment, the delivery assembly 306 may include a duct portion 324 communicatively coupled between the core engine 114 and the storage vessel 302. In such an embodiment, the atomization of the treating fluid 304 may occur in, or adjacent to, the storage vessel 302. The atomized droplets may enter the duct portion 324 of the delivery assembly 306 and be delivered to the annular inlet 120 by the flow generating assembly 314. In an embodiment, the flow generating assembly 314 may be incorporated into the duct portion 324. Additionally, in an embodiment, duct portion 324 may incorporate the heating element(s) 316.

Referring again to FIGS. 1-3, in an embodiment, the system 300 may include the flow generation assembly 314. The flow generation assembly 314 may facilitate the passage of the treating mist 312 along the flow of path 104 by developing the airflow 318. In an embodiment, the flow generation assembly 314 may be configured to drive or draw a portion of atmospheric air so as to generate the airflow 318. In such an embodiment, the flow generation assembly 314 may, for example, be configured as a fan. Accordingly, the flow generation assembly may be positioned upstream of the annular inlet 120 when configured to accelerate or drive the airflow 318 and may be positioned downstream of the engine 100 when configured to draw the treating mist 312 through the flow path(s) 104.

In an embodiment, the flow generation assembly 314 may be configured to establish a pressure differential between the annular inlet 120 and the point-of-departure 136. For example, in an embodiment, the flow generation assembly 314 may be configured as the compressed air source 326. In such an embodiment, the compressed air may not only drive the treating fluid 304 through the nozzle 310, but the venting of the compressed air through the nozzle 310 may create a region of increased pressure in fluid communication with the annular inlet 120. The region of increased pressure may drive the treating mist 312 through the flow path(s) 104. In a further embodiment, a high-pressure region may be established adjacent to the annular inlet 120 via the heating of a portion of atmospheric air adjacent to the annular inlet 120. In yet a further embodiment, the flow generation assembly 314 may be positioned downstream of the engine 100 and configured to establish a low-pressure region adjacent to the point-of-departure 136.

In an embodiment, the system 300 may include an extraction element 346. The extraction element 346 may be positioned at the point-of-departure 136 (e.g. adjacent the axial position downstream (B)). The extraction element 346 may be configured to extract a residual portion of the treating mist 312 from the airflow 318. For example, the extraction element 346 may include a condenser, a mesh, and/or equivalent structure. In an embodiment, the extraction element 346 may be an independent element of the system 300. However, in an embodiment, the extraction element 346 may be incorporated as a component of the flow generation assembly 314 when the flow generation assembly 314 is positioned at the point-of-departure 136.

The extraction element 346 may, in an embodiment, store the extracted residual portion of the cleaning mist 312. In such an embodiment, the extracted residual portion of the cleaning best 312 may be subsequently disposed of, reused, or treated and reused. In an additional embodiment, the extraction element 346 may be fluidly coupled to the storage vessel 302 thereby facilitating the recirculation of at least a portion of the treating fluid 304. It should be appreciated that employing the extraction element 346 may increase the safety and/or efficiency of the system 300. For example, extracting the residual portion of the treating mist 312 at the point-of-departure 136 may protect personnel from inhalation hazards, reduce environmental contamination, and/or reduce contamination of airframe parts by the treating fluid 302.

Referring still to FIGS. 1-3, in an embodiment, the flow generation assembly 314 of the system 300 may be configured as a heat source positioned downstream of the point-of-departure 136. In such an embodiment, the flow generation assembly 314 may heat the portion of atmospheric air adjacent to the point-of-departure 136. This heating of the atmospheric air may establish the airflow 318 as a convection current through the core engine 114. The treating mist 312 may be drawn through the flow path(s) 104 via the convection current.

Referring again to FIG. 1, in an embodiment, the system 300 may include a control unit 308. The control unit 308 may, in an embodiment, include a plurality of controls configured to permit an operator to employ the system 300 to treat the component(s) 102 of the installed and assembled gas turbine engine 100 (e.g., the assembled, on-wing gas turbine engine). For example, in an embodiment, the controls may be configured to permit an operator to employ the system 300 to remove a deposit from the component(s) 102 of the installed and assembled gas turbine engine 100. In at least one embodiment, the control unit may include various readouts configured to provide the operator with information concerning the treating of the engine 100 and various manual controls configured to provide the operator with the necessary degree of control over the methods described herein to remove deposits from the component(s) 102. In an additional embodiment, the control unit 308 may also include a controller 400. The controller 400 may also be configured to implement the methods discussed herein to treat the component(s) 102 of the engine 100. It should be appreciated that the controller 400 may be employed in combination with various manual controls and displays to facilitate an operator's control of the methods described herein.

In an embodiment, treating (e.g. cleaning) the component(s) 102 may include the operator/controller 400 obtaining environmental data indicative of the environmental conditions affecting the installed and assembled gas turbine engine. For example, the environmental data may include an ambient temperature, an ambient pressure, and an ambient humidity affecting the engine 100. In an embodiment, the environmental data may also include data indicative of the type of suspended atmospheric particulate (e.g. dust-reacted and unreacted, sand, etc.), an atmospheric particulate concentration, and/or an atmospheric particulate size for an operating environment of the engine 100. In other words, the environmental data may include data on the type and severity of contaminants encountered during the engine's operations. It should be appreciated that the information concerning the encountered particulates may be utilized by the operator/controller 400 to determine a treating fluid composition, treating operation duration and/or treating operation frequency. For example, the information concerning the encountered particulates may be utilized by the operator/controller 400 to determine a cleaning fluid composition which may effectively remove deposits from or prevent the corrosion of the component (s) 102. It should further be appreciated that the environmental data may be obtained from any suitable source, such as a plurality of sensors, an external provider, and/or a lookup table.

The operator/controller 400 may also obtain data indicative of the thermal state of the core engine 114. The thermal state may indicate a difference between the temperature of components within the core engine 114 and the ambient temperature. The data indicative of the thermal state may be obtained via at least one sensor and/or via a lookup table. For example, the thermal state may be determined relative to an elapsed time since engine shutdown under ambient atmospheric conditions. Based on the environmental data and the data indicative of the thermal state, the operator/controller 400 may establish the treating mist volume delivered to the annular inlet 120. For example, establishing the treating mist volume may include actuating a nozzle 310 to establish a concentration of atomized droplets within a specified portion 330 of the flow path(s) 104 at a specified time interval. Additionally, establishing the treating mist volume may also include establishing a treating mist flow rate within the flow path(s) 104. Establishing the treating mist flow rate may include establishing/modifying the velocity of the airflow 318. It should be appreciated that the velocity of the airflow 318 in conjunction with the number of nozzles 310 actuated may affect the resultant density of the treating mist 312 within the flow path(s) 104.

Referring still to FIG. 1, in an embodiment, the system 300 may also include in electronic sensor 328 (e.g., a humidity sensor, a lidar unit, an anemometer, and/or any other suitable sensor for detecting water/water vapor). The electronic sensor 328 may be communicatively coupled to the control unit 308 and may be positioned at the point-of-departure 136 from the assembled, on-wing, gas turbine engine 100. The electronic sensor 328 may monitor an absolute humidity level and/or quantity of liquid water droplets at the point-of-departure 136. The absolute humidity level/water droplet quantity may be utilized by the operator/controller 400 to determine a percentage of the delivered treating mist 312 remaining suspended at the point-of-departure 136 from the engine 100. For example, the absolute humidity level at the point-of-departure 136 may, when corrected for the ambient temperature, be indicative of the fluid content of the airflow 318 at the point-of-departure 136. The fluid content may, in turn, be indicative of a percentage of treating mist 312 introduced to the annular inlet 120 which remains suspended at the point-of-departure 136.

Utilizing the determined percentage of the treating mist 312 remaining suspended at the point-of-departure 136, the operator/controller 400 may, in an embodiment, adjust the treating mist volume delivered to the annular inlet 120 so as to achieve a desired level of wetting of the component(s) 102. For example, in an embodiment wherein the thermal state of the engine 100 is relatively high when the system 300 is activated, a significant percentage of the treating mist 312 may be converted to vapor in cooling the core engine 114. In such an embodiment, the absolute humidity level at the point-of-departure 136 may be relatively close to the ambient humidity level and may indicate a need to increase the treating mist volume to achieve the desired level of wetting of the component(s) 102. In a further embodiment, the absolute humidity level at the point-of-departure 136 may be significantly higher than the ambient humidity level, thus indicating an excessive amount of treating mist 312 remains suspended at the point-of-departure 136. In such an embodiment, the operator/controller 400 may reduce the treating mist volume and/or the velocity of airflow 318 so as to improve the efficiency of the system 300. Accordingly, in an embodiment, a treating cycle of the engine 100 may consume less than 57 liters of treating fluid 304. For example, the system 300 may, in an embodiment, be employed to clean the engine 100 while consuming less than 57 liters of treating fluid 304 configured as a cleaning fluid.

In an embodiment, such as particularly depicted in FIGS. 2 and 3, the system 300 may be configured to determine a first volume of treating fluid 304 atomized and delivered as the treating mist 312 to the annular inlet. The first volume may, for example, be determined via the monitoring of a dispersal rate of the treating fluid 304 from the storage vessel 302. In an embodiment, the system 300 may also be configured to determine a second volume 332 of treating fluid 304 suspended at the point-of-departure 136 based on the retained total water level as may be indicated by the monitored absolute humidity level. Computing the difference between the first and second volumes may indicate the portion of the first volume of the treating fluid 304 precipitated/impacted onto the component(s) 102.

In an embodiment, the operator/controller 400 may adjust the treating mist volume delivered to the annular inlet 120 so that the second volume is less than or equal to 35% of the first volume. In other words, the system 300 may, in an embodiment, be configured to deliver the treating mist 312 at a treating mist volume and flowrate at which 65% or more of the treating mist 312 is deposited within the core engine 114. This may, for example, be desirable in an embodiment wherein the engine 100 is in a cold, thermally stable condition. However, for a hot engine 100, excess treating fluid 30 may be introduced to the engine 100 so as to accelerate the cooling and wetting of the surfaces of the component(s) 102. Accordingly, the second volume may exceed 35% of the first volume. It should be appreciated that ensuring that no more than 35% of the treating mist 312 passes completely through the core engine 114 once the core engine 114 is cooled may ensure that the system 300 is operating in an efficient manner. For example, the efficient manner may be defined by the execution of a treating cycle within 15 minutes which consumes less than 57 liters of treating fluid 304.

Referring again to FIG. 1, in an embodiment, the system 300 may include at least one blocking element 334 circumscribing the annular inlet 120. Additionally, in an embodiment, the blocking element(s) 334 may circumscribe the array of nozzles 320. The blocking element(s) 334 may at least partially occlude the alternative flow path(s) 148. It should be appreciated that occluding the alternative flow path(s) 148, may increase the efficiency of the system 300 by reducing or eliminating the portion of the treating mist 312 which may bypass the flow path(s) 104.

Figure 4:
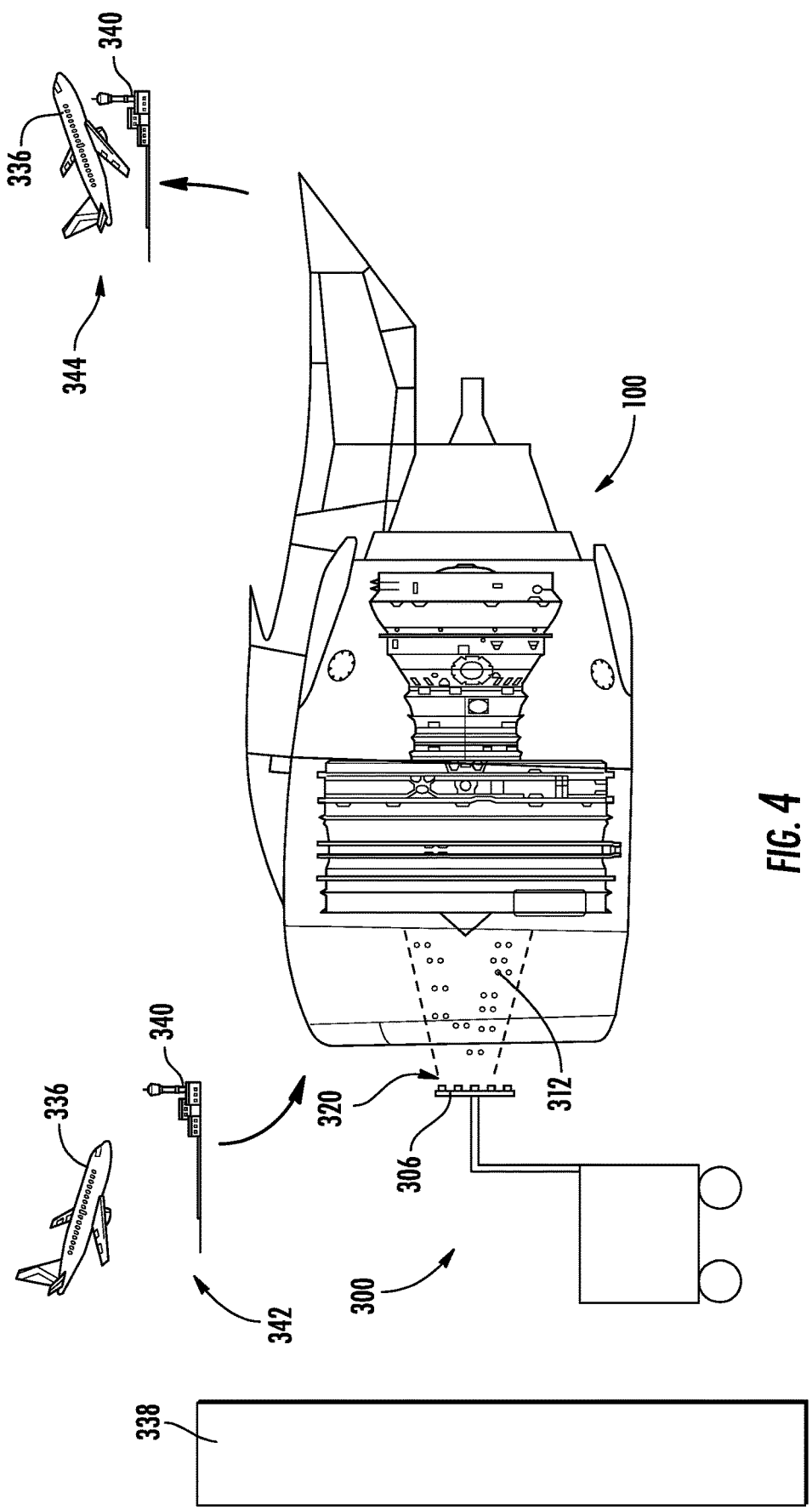

Referring now to FIG. 4, in an embodiment, the system 300 may be configured for employment on the engine 100 while the aircraft 336 is parked at a gate 338 of an airport 340. Accordingly, the engine 100 may be treated utilizing the system 300 following a landing 342 or prior to a takeoff 344 without requiring that the aircraft 336 be moved to a maintenance area of the airport 340. For example, the engine 100 may be cleaned utilizing the system 300 following a landing 342 or prior to a takeoff 344 without requiring that the aircraft 336 be moved to a maintenance area of the airport 340. It should be appreciated that performing the treating (e.g. cleaning) operations described herein while the aircraft 336 is located at the gate 338 may reduce or eliminate the amount of time the aircraft 336 is removed from service for engine treating operations.

In an embodiment, the system 300 may be configured to execute a treating cycle which has a duration of 30 minutes or less and a consumption of less than 120 liters. For example, the system 300 may be employed to dissolve a portion of the deposits on the component(s) 102 within 15 minutes of the cycle initiation with a consumption of less than 57 liters.

In an embodiment, following the conclusion of the treating cycle, the delivery assembly 306 may be operably decoupled from the annular inlet 120. However, as the treating cycle disclosed herein does not require a rinse cycle, the component(s) 102 may remain in a wetted condition following the operable decoupling of the delivery assembly 306.

In an embodiment, the absence of a requirement to rinse the engine may be leveraged by supplying a surge portion of the treating mist 312 to the core engine 114 prior to operably decoupling the delivery assembly 306. In such an embodiment, a soak period may be established following the operable decoupling of the delivery assembly 306 during which the treating fluid 304 continues affecting the component(s) 102. For example, the soak period may facilitate the continued affecting of the deposits on the component(s) 102 by the treating fluid 304 following the operable decoupling of the delivery assembly 306. Accordingly, the surge portion may increase the wetness of the component(s) 102, thereby increasing the effectiveness of the soak period.

In an embodiment, following the introduction of the treatment fluid 304, the engine 100 may be placed into a low-power, low-temperature operating condition for a specified duration in order to complete the treatment operation. For example, placing the engine 100 into a low-power, low temp operating condition for 15-60 minutes may melt, cure, and/or oxidize the deposited treatment fluid 304. The melting, curing, and/or oxidizing may ensure that the deposited treatment fluid 304 is stable on the component(s) 102 prior to the engine 100 being brought to full power. It should be appreciated that bringing the engine 100 to full power prior to the melting, curing, and/or oxidizing may aerodynamically and/or through rapid thermal shock remove the treatment fluid 304 before it is bonded and/or the treatment operation is complete.

The ability to execute a treating cycle within 30 minutes or less while the aircraft 336 is parked at the gate 338 may facilitate an increased treating frequency relative to current engine treating approaches. As such, in an embodiment, the treating of the component(s) 102 may be repeated at least once every 30 days and/or engine cycles. For example, the ability to execute a cleaning cycle within 30 minutes or less while the aircraft 336 is parked at the gate 338 may facilitate an increased cleaning frequency relative to current engine cleaning approaches. As such, in an embodiment, the removing of the deposit from the component(s) 102 may be repeated at least once every 30 days and/or engine cycles. Accordingly, in an embodiment, the system 300 may be employed at least once every 7 days to treat/remove deposits from the component(s) 102. It should be appreciated that an engine cycle may correspond to a 24-hour period, a takeoff/landing sequence, and/or a specified quantity of engine operating hours.

In an embodiment, the data on the type and severity of contaminants encountered during the engine's operations may be utilized to modify the treating interval. For example, the type and/or severity of the contaminants encountered during the engine's operations may be high and may indicate that a reduced treating (e.g., cleaning) interval may be warranted. Such particulate conditions may, for example, be encountered when operating the engine 100 in dusty/desert environments and may justify removing the deposits from the component(s) 102 with the system 300 on a nightly basis.

It should be appreciated that frequent treatments may preserve the efficiency and lifespan of the engine 100. It should also be appreciated that the more frequent treatments, such as cleanings, may, individually, remove a smaller percentage of the deposits on the component(s) 102 relative to traditional water/foam treatment/washes. However, the effects of frequent treatments may accumulate such that the combined effect of the frequent treatments is cumulatively greater than any single water/foam treatment. As a result, the shortened intervals between treatments/clinics may result in the engine being operated in a less-fouled condition for a greater percentage of the time than is achievable under traditional approaches.

Figure 6:
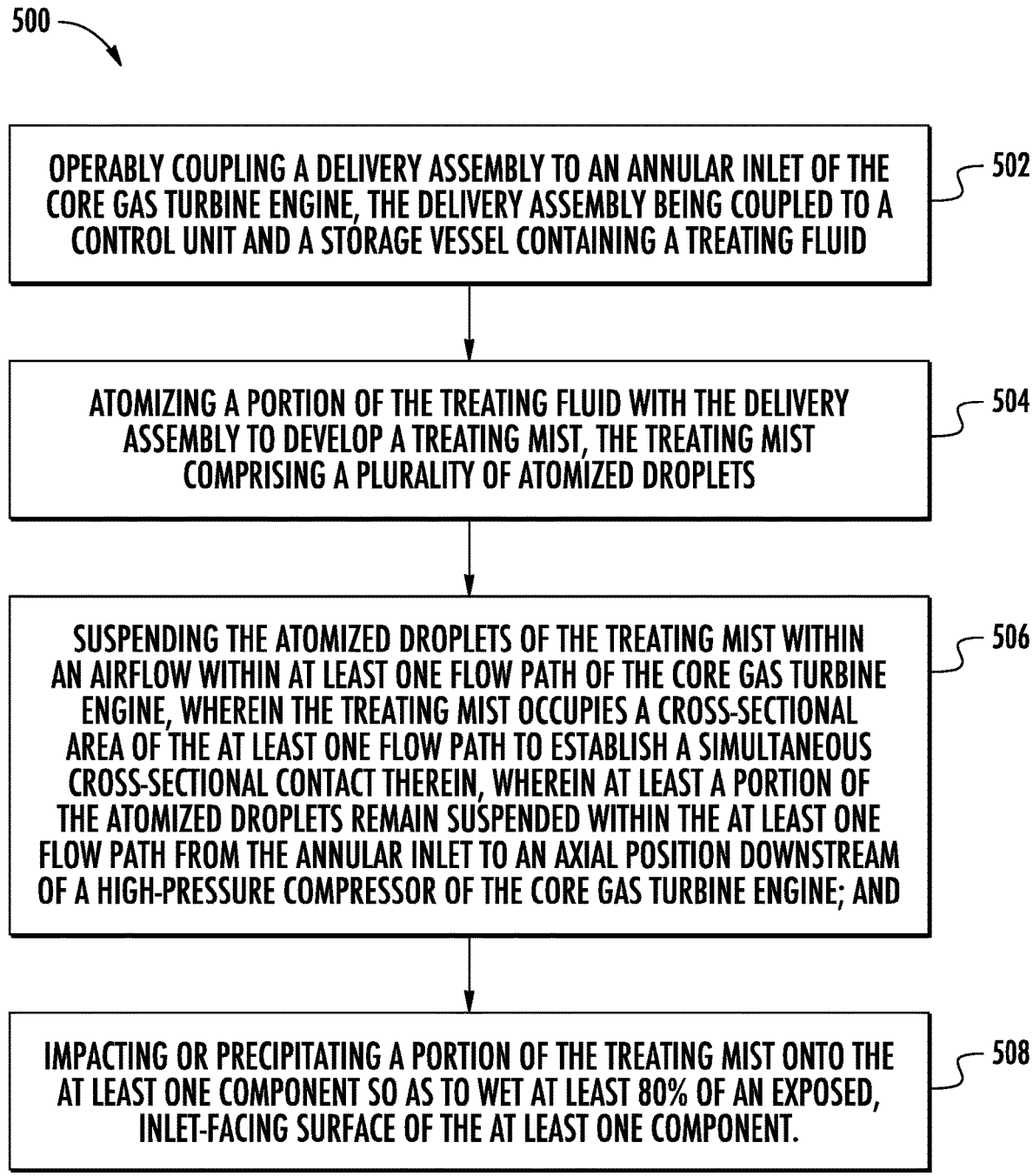

Referring now to FIG. 6, a flow diagram of one embodiment of a method 504 treating at least one component of an installed and assembled gas turbine engine is illustrated. The method 500 may be implemented using, for instance, the system 300 discussed above with references to FIGS. 1-4. FIG. 6 depicts steps performed in a particular order for purposes of illustration and discussion. Those of ordinary skill in the art, using the disclosures provided herein, will understand that various steps of the method 500, or any of the methods disclosed herein, may be adapted, modified, rearranged, performed simultaneously, or modified in various ways without deviating from the scope of the present disclosure.

As shown at (502), the method 500 may include operably coupling a delivery assembly to an annular inlet of the core gas turbine engine. The delivery assembly being coupled to a control unit and a storage vessel containing a treating fluid. As shown at (504), the method 500 may include atomizing a portion of the treating fluid with the delivery assembly to develop a treating mist. The treating mist may include a plurality of atomized droplets. Additionally, as shown at (506), the method 500 may include suspending the atomized droplets of the treating mist within an airflow within at least one flow path of the core gas turbine engine. The treating mist may occupy a cross-sectional area of the at least one flow path to establish a simultaneous cross-sectional contact therein. At least a portion of the atomized droplets may remain suspended within the at least one flow path from the annular inlet to an axial position downstream of a compressor of the gas turbine engine. As shown at (508), the method 500 may include impacting or precipitating a portion of the treating mist onto the at least one component so as to wet at least 80% of an exposed surface of the at least one component.

Figure 5:
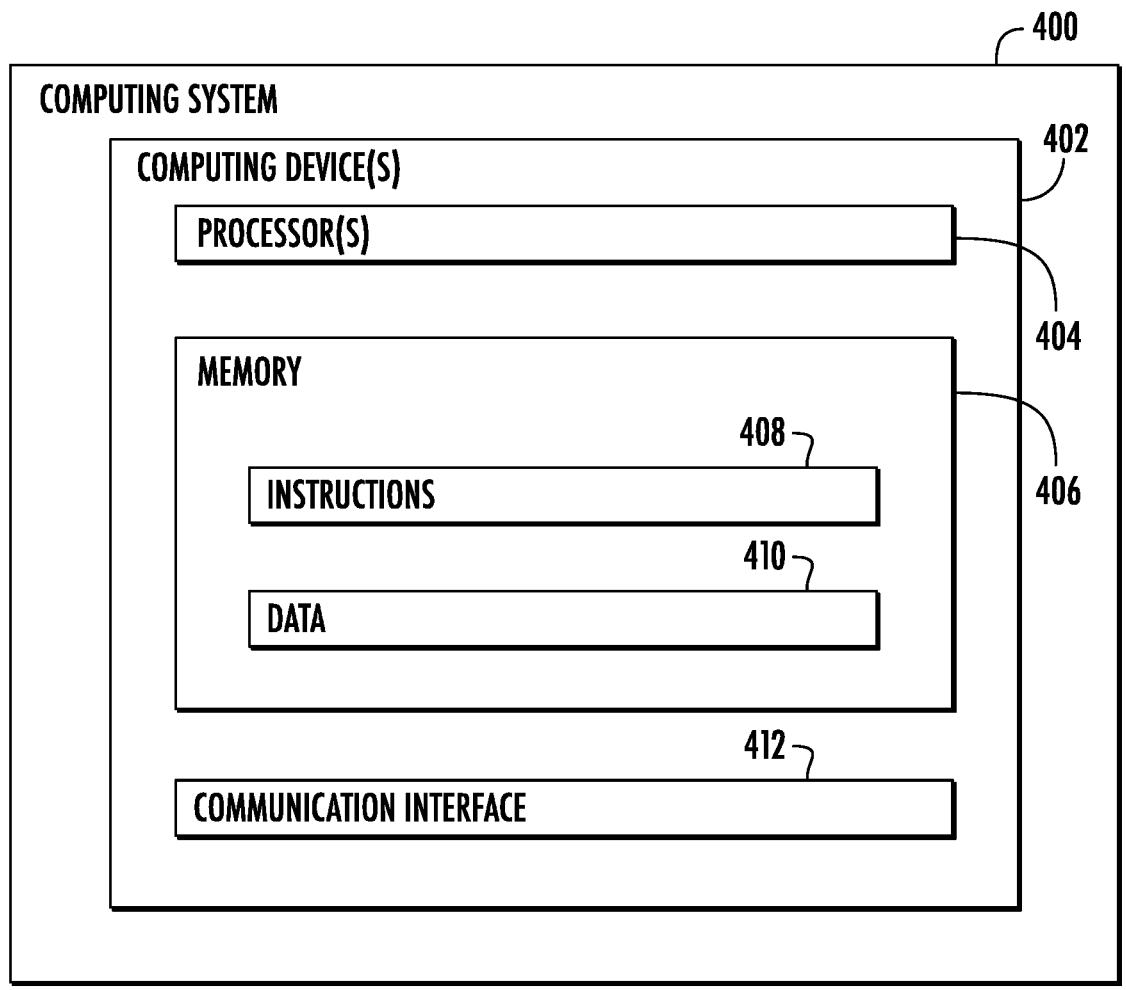

FIG. 5 provides a block diagram of an exemplary controller 400 that may be used to implement the methods and systems described herein according to exemplary embodiments of the present disclosure. Though described below as a computing system, it should be appreciated that in some embodiments, the controller may be an analog system or an electrical system that does not include a computing device. As shown, the computing system 400 may include one or more computing device(s) 402. The one or more computing device(s) 402 may include one or more processor(s) 404 and one or more memory device(s) 406. The one or more processor(s) 404 may include any suitable processing device, such as a microprocessor, microcontroller, integrated circuit, logic device, or other suitable processing device. The one or more memory device(s) 406 may include one or more computer-readable media, including, but not limited to, non-transitory computer-readable media, RAM, ROM, hard drives, flash drives, or other memory devices.

The one or more memory device(s) 406 may store information accessible by the one or more processor(s) 404, including computer-readable instructions 408 that may be executed by the one or more processor(s) 404. The instructions 408 may be any set of instructions that when executed by the one or more processor(s) 404, cause the one or more processor(s) 404 to perform operations. The instructions 408 may be software written in any suitable programming language or may be implemented in hardware. In some embodiments, the instructions 408 may be executed by the one or more processor(s) 404 to cause the one or more processor(s) 404 to perform operations, such as implementing one or more of the processes mentioned above.

The memory device(s) 404 may further store data 410 that may be accessed by the processor(s) 404. The data 410 may include one or more table(s), function(s), algorithm(s), model(s), equation(s), etc. according to example embodiments of the present disclosure.

The one or more computing device(s) 402 may also include a communication interface 412 used to communicate, for example, with the other component(s)s of system. The communication interface 412 may include any suitable component(s)s for interfacing with one or more network(s), including for example, transmitters, receivers, ports, controllers, antennas, or other suitable component(s)s.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for treating at least one component of an installed and assembled gas turbine engine, the gas turbine engine comprising a core gas turbine engine, the core gas turbine engine having an absence of powered rotation during the treating, the method comprising: operably coupling a delivery assembly to an annular inlet of the core gas turbine engine, the delivery assembly being coupled to a control unit and a storage vessel containing a treating fluid; atomizing a portion of the treating fluid with the delivery assembly to develop a treating mist, the treating mist comprising a plurality of atomized droplets; suspending the atomized droplets of the treating mist within an airflow within at least one flow path of the core gas turbine engine, wherein the treating mist occupies a cross-sectional area of the at least one flow path to establish a simultaneous cross-sectional contact therein, wherein at least a portion of the atomized droplets remain suspended within the at least one flow path from the annular inlet to an axial position downstream of a high-pressure compressor of the core gas turbine engine; and impacting or precipitating a portion of the treating mist onto the at least one component so as to wet at least 80% of an exposed, inlet-facing surface of the at least one component.

Clause 2. The method of clause 1, wherein the atomized droplets have a median diameter of less than or equal to 5 microns and the treating mist has a fluid-to-air mass ratio of at least 0.025 and less than or equal to 5.0 kilograms of treating fluid to kilograms of air.

Clause 3. The method of any preceding clause, wherein a thermal state of the core gas turbine engine is less than or equal to 135% of an ambient air temperature, and wherein the axial position downstream of the compressor is an axial position downstream of the installed and assembled gas turbine engine.

Clause 4. The method of any preceding clause, further comprising: establishing an elevated delivery temperature of the treating mist which increases a vapor content of the treating mist within the at least one flow path.

Clause 5. The method of any preceding clause, further comprising: supplying a surge portion of the treating mist to the core gas turbine engine; operably decoupling the delivery assembly from the annular inlet; and establishing a soak period during which the treating fluid affects at least one of the at least one component and a deposit thereon.

Clause 6. The method of any preceding clause, wherein the delivery assembly comprises an array of nozzles, wherein each nozzle of the array of nozzles is configured to develop atomized droplets having a median diameter of less than or equal to 5 microns, the method further comprising: actuating at least one nozzle of the array of nozzles to establish a treating mist volume, wherein the treating mist volume comprises a concentration of atomized droplets within a specified portion of the at least one flow path, the treating mist volume being characterized by a fluid-to-air mass ratio of at least 0.025 and less than or equal to 5.0 kilograms of treating fluid to kilograms of air.

Clause 7. The method of any preceding clause, further comprising: obtaining environmental data, the environmental data comprising an ambient temperature, an ambient pressure, and an ambient humidity affecting the installed and assembled gas turbine engine; obtaining data indicative of a thermal state of the core gas turbine engine; and based on the environmental data and the data indicative of the thermal state of the core gas turbine engine, establishing the treating mist volume delivered to the annular inlet, wherein establishing the treating mist volume further comprises establishing a treating mist flow rate within the at least one flow path.

Clause 8. The method of any preceding clause, wherein the environmental data further comprises data indicative of at least one of a type of suspended atmospheric particulate, an atmospheric particulate concentration, and an atmospheric particulate size for an operating environment of the installed and assembled gas turbine engine.

Clause 9. The method of any preceding clause, wherein further comprising: monitoring an absolute humidity level at a point-of-departure from the installed and assembled gas turbine engine; utilizing the monitored absolute humidity level to determine a percentage of the delivered treating mist remaining suspended at the point-of-departure from the installed and assembled gas turbine engine; and adjusting the treating mist volume delivered to the annular inlet based on the determined percentage so as to achieve a desired level of wetting of the at least one component.

Clause 10. The method of any preceding clause, further comprising: determining a first volume of treating fluid atomized and delivered as the treating mist to the annular inlet; determining a second volume of treating fluid suspended at the point-of-departure from the installed and assembled gas turbine engine based on the monitored humidity level; computing the portion of the first volume of treating fluid precipitated onto the at least one component based on a difference between the first and second volumes; and adjusting the treating mist volume delivered to the annular inlet so that the second volume is less than or equal to 35% of the first volume.

Clause 11. The method of any preceding clause, wherein the delivery assembly comprises an array of nozzles, and wherein operably coupling the delivery assembly to the annular inlet further comprises: positioning the array of nozzles within the fan section so that an outlet of each nozzle of the array of nozzles is arranged at an axial location between the fan section and the annular inlet of the core gas turbine engine; and circumscribing the array of nozzles with at least one blocking element, wherein the at least one blocking element at least partially occludes an alternative flow path.

Clause 12. The method of any preceding clause, further comprising: establishing a negative pressure differential between the annular inlet and a point-of-departure from the installed and assembled gas turbine engine, wherein the negative pressure differential draws a portion of the treating mist through the core gas turbine engine.

Clause 13. The method of any preceding clause, wherein operably coupling the delivery assembly to the annular inlet of the core gas turbine engine further comprises operably coupling the delivery assembly to the annular inlet of the core gas turbine engine of an aircraft parked at a gate of an airport.

Clause 14. The method of any preceding clause, wherein treating the at least one component of the installed and assembled gas turbine engine is repeated at least once every 30 days.

Clause 15. The method of any preceding clause, further comprising: establishing a treating cycle, wherein the treating cycle has a duration of 30 minutes or less; and operably decoupling the delivery assembly from the annular inlet by a conclusion of the treating cycle.

Clause 16. The method of any preceding clause, wherein atomizing a portion of the treating fluid comprises atomizing less than 120 liters of treating fluid.

Clause 17. The method of any preceding clause, wherein the treating fluid comprises a cleaning fluid, wherein the treating mist is a cleaning mist, and wherein the method further comprises: dissolving at least a portion of a deposit on the at least one component so as to remove the deposit.

Clause 18. The method of any preceding clause, wherein the treating fluid comprises a corrosion inhibitor, the corrosion inhibitor being a catalyst configured to react with at least one identified contaminant so as to inhibit corrosion of the at least one component.

Clause 19. The method of any preceding clause, wherein the treating fluid comprises a sealant configured to preclude a contact between a contaminant and the at least one component.

Clause 20. The method of any preceding clause, wherein atomizing the portion of the treating fluid further comprises: atomizing the portion of the treating fluid via a vibrating mesh nebulizer so as to develop the plurality of atomized droplets having a median diameter of at least 2 microns and less than or equal to 5 microns.

Clause 21. The method of any preceding clause, further comprising: treating an internal passage of the at least one component via the penetration of the internal passage by the atomized droplets, wherein penetration of the internal passage removes at least a portion of a deposit therein.

What is claimed is:

1. A method for treating at least one component of an installed and assembled gas turbine engine, the gas turbine engine comprising a core gas turbine engine, the method comprising:
   operably locating a delivery assembly relative to an annular inlet of the core gas turbine engine, the delivery assembly being operably coupled to a control unit and a storage vessel containing a treating fluid;
   atomizing a portion of the treating fluid with the delivery assembly to develop a treating mist, the treating mist comprising a plurality of atomized droplets;
   suspending the atomized droplets of the treating mist within an airflow within at least one flow path of the core gas turbine engine, wherein the treating mist occupies a cross-sectional area of the at least one flow path to establish a simultaneous cross-sectional contact therein, wherein at least a portion of the atomized droplets remain suspended within the at least one flow path from the annular inlet to an axial position downstream of a compressor of the core gas turbine engine; and
   depositing a portion of the treating mist onto the at least one component so as to wet at least 80% of an exposed surface of the at least one component.

2. The method of claim 1, wherein the atomized droplets have a median diameter of less than or equal to 5 microns and the treating mist has a fluid-to-air mass ratio of at least 0.025 and less than or equal to 5.0 kilograms of treating fluid to kilograms of air.

3. The method of claim 1, wherein a thermal state of the core gas turbine engine is less than or equal to 135% of an ambient air absolute temperature, and wherein the axial position downstream of the compressor is an axial position downstream of the installed and assembled gas turbine engine.

4. The method of claim 1, further comprising:
establishing a delivery temperature of the treating mist which increases a vapor content of the treating mist within the at least one flow path.

5. The method of claim 1, further comprising:
supplying a surge portion of the treating mist to the core gas turbine engine;
operably decoupling the delivery assembly from the annular inlet; and
establishing a soak period during which the treating fluid affects at least one of the at least one component and a deposit thereon.

6. The method of claim 1, wherein the delivery assembly comprises an array of nozzles, wherein each nozzle of the array of nozzles is configured to develop atomized droplets having a median diameter of less than or equal to 5 microns, the method further comprising:
actuating at least one nozzle of the array of nozzles to establish a treating mist volume, wherein the treating mist volume comprises a concentration of atomized droplets within a specified portion of the at least one flow path, the treating mist volume being characterized by a fluid-to-air mass ratio of at least 0.025 and less than or equal to 5.0 kilograms of treating fluid to kilograms of air.

7. The method of claim 6, further comprising:
obtaining environmental data, the environmental data comprising an ambient temperature, an ambient pressure, and an ambient humidity affecting the installed and assembled gas turbine engine;
obtaining data indicative of a thermal state of the core gas turbine engine; and
based on the environmental data and the data indicative of the thermal state of the core gas turbine engine, establishing the treating mist volume delivered to the annular inlet, wherein establishing the treating mist volume further comprises establishing a treating mist flow rate within the at least one flow path.

8. The method of claim 7, wherein further comprising:
monitoring an absolute humidity level at a point-of-departure from the installed and assembled gas turbine engine;
utilizing the monitored absolute humidity level to determine a percentage of the delivered treating mist remaining suspended at the point-of-departure from the installed and assembled gas turbine engine; and
adjusting the treating mist volume delivered to the annular inlet based on the determined percentage so as to achieve a desired level of wetting of the at least one component.

9. The method of claim 8, further comprising:
determining a first volume of treating fluid atomized and delivered as the treating mist to the annular inlet;
determining a second volume of treating fluid suspended at the point-of-departure from the installed and assembled gas turbine engine based on the monitored humidity level;
computing the portion of the first volume of treating fluid precipitated onto the at least one component based on a difference between the first and second volumes; and
adjusting the treating mist volume delivered to the annular inlet so that the second volume is less than or equal to 35% of the first volume.

10. The method of claim 1, wherein the delivery assembly comprises an array of nozzles, and wherein operably locating the delivery assembly relative to the annular inlet further comprises:
positioning the array of nozzles within a fan section of the gas turbine engine so that an outlet of each nozzle of the array of nozzles is arranged at an axial location between the fan section and the annular inlet of the core gas turbine engine; and
circumscribing the array of nozzles with at least one blocking element, wherein the at least one blocking element at least partially occludes an alternative flow path.

11. The method of claim 1, further comprising:
establishing a negative pressure differential between the annular inlet and a point-of-departure from the installed and assembled gas turbine engine, wherein the negative pressure differential draws a portion of the treating mist through the core gas turbine engine.

12. The method of claim 1, wherein operably locating the delivery assembly relative to the annular inlet of the core gas turbine engine further comprises operably coupling the delivery assembly to the annular inlet of the core gas turbine engine of an aircraft parked at a gate of an airport.

13. The method of claim 1, wherein treating the at least one component of the installed and assembled gas turbine engine is repeated at least once every 30 days.

14. The method of claim 1, further comprising:
establishing a treating cycle, wherein the treating cycle has a duration of 30 minutes or less; and
operably decoupling the delivery assembly from the annular inlet by a conclusion of the treating cycle.

15. The method of claim 1, wherein atomizing a portion of the treating fluid comprises atomizing less than 120 liters of treating fluid.

16. The method of claim 1, wherein the treating fluid comprises a cleaning fluid, wherein the treating mist is a cleaning mist, and wherein the method further comprises:
dissolving at least a portion of a deposit on the at least one component so as to remove the deposit.

17. The method of claim 1, wherein the treating fluid comprises a corrosion inhibitor, the corrosion inhibitor being a catalyst configured to react with at least one identified contaminant so as to inhibit corrosion of the at least one component.

18. The method of claim 1, wherein the treating fluid comprises a sealant configured to preclude a contact between a contaminant and the at least one component.

19. The method of claim 1, wherein atomizing the portion of the treating fluid further comprises:
atomizing the portion of the treating fluid via a vibrating mesh nebulizer so as to develop the plurality of atomized droplets having a median diameter of at least 2 microns and less than or equal to 5 microns.

20. The method of claim 1, further comprising:
treating an internal passage of the at least one component via penetration of the internal passage by the atomized droplets, wherein penetration of the internal passage removes at least a portion of a deposit therein.

21. The method of claim 1, wherein the core gas turbine engine has an absence of engine-powered rotation during the treating.

* * * * *